Patented Nov. 18, 1952

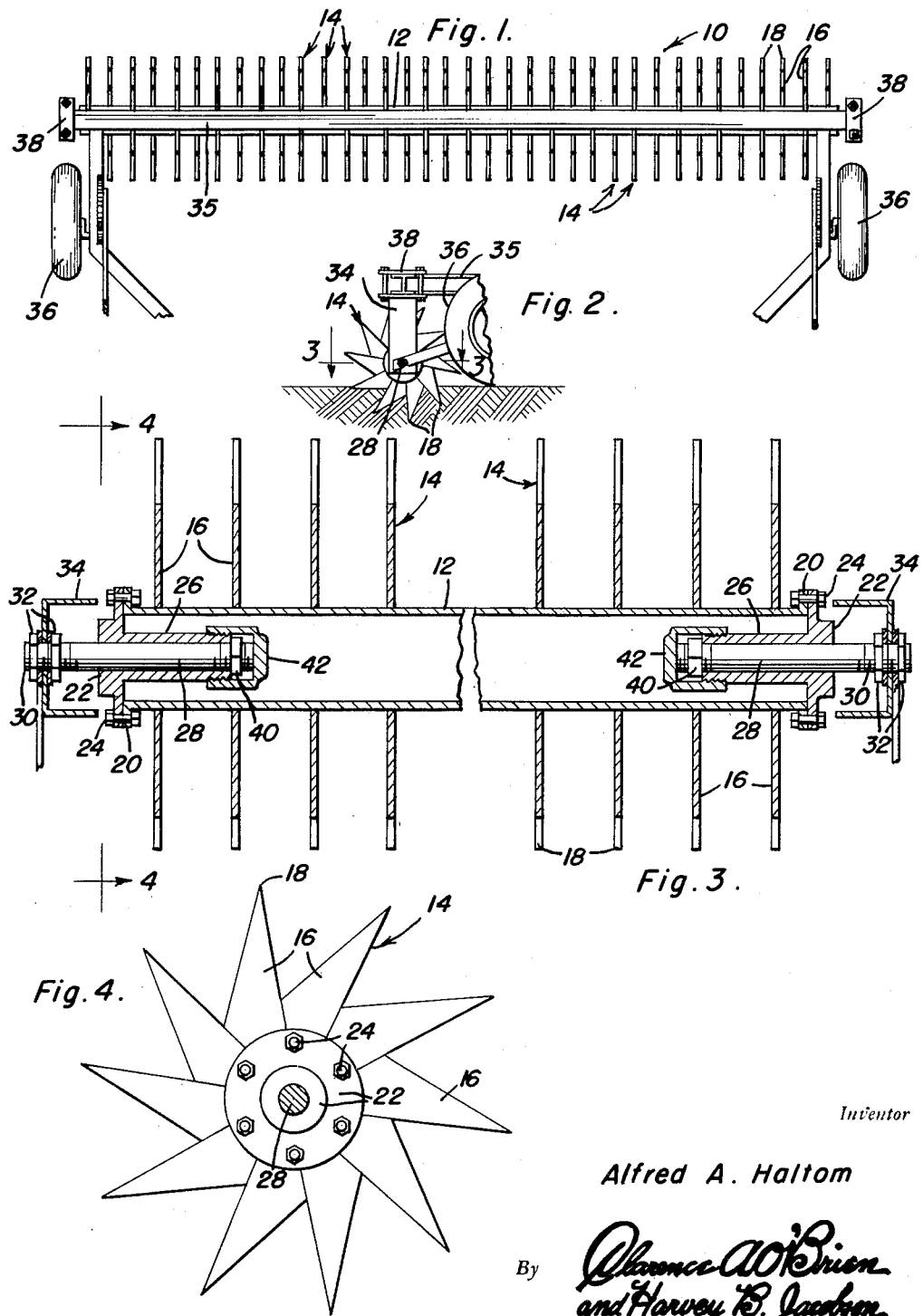

2,618,518

UNITED STATES PATENT OFFICE 2,618,518

REMOVABLE BEARING

Alfred A. Haltom, Alva, Okla.

Application June 3, 1949, Serial No. 96,984

1 Claim. (Cl. 308—19)

This invention relates to new and useful improvements and structural refinements in cultivators, and the principal object is to facilitate efficient cultivation of small grain by breaking the top soil and making it possible for moisture to reach the roots of the plant, so that the plant has an excellent chance of spreading roots and establishing a firm hold in the ground.

This object is achieved by the provision of a cultivator consisting of a rotatable barrel provided with a set of cultivating members in the form of radially disposed, substantially triangular elements having pointed extremities adapted to penetrate the ground, and an important feature of the invention resides in the rotatable mounting of the cultivator barrel on suitable supports, preferably those adapted to be conveniently associated with a conventional plow frame.

Some of the advantages of the invention reside in its simplicity of construction, in its efficient operation, in its durability, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a top plan view of the invention.

Figure 2 is a fragmentary side elevational view thereof.

Figure 3 is a cross sectional detail, taken substantially in the plane of the line 3—3 in Figure 2, and Figure 4 is a cross sectional view, taken substantially in the plane of the line 4—4 in Figure 3.

Like characters of reference are employed to designate like parts in the specification and throughout the several views.

Referring now to the accompanying drawings in detail, the invention consists of a cultivator designated generally by the reference character 10, the same embodying in its construction a horizontally disposed, rotatably mounted barrel 12 which is preferably tubular and is provided on the outer surface thereof with a set of cultivating members 14 which are longitudinally spaced on the barrel 12, substantially as shown in Figures 1 and 3.

Each of the members 14 simply consists of a plurality of substantially triangular elements 16 disposed in co-planar relation and having sharp apices 18 radiating outwardly from the barrel 12, as illustrated in Figure 4.

The elements 16 in each member 14 may be welded together and to the barrel 12, so that the barrel, together with the elements, assumes the form of a rigid unit.

The essence of novelty of the invention resides in the rotatable mounting of the barrel 12, this involving the provision of outturned flanges 20 at the ends of the barrel, to which flanges, in turn, are secured suitable end caps 22, as indicated at 24.

The caps 22, in turn, are provided with integral sleeves 26 which extend inwardly in the barrel 12 and rotatably accommodate a pair of axially aligned trunnions 28.

The outer end portions of these trunnions project from the caps 22 and are externally screw threaded as at 30 so that they may be rigidly secured by suitable lock nuts 32 to upright members 34 of a conventional plow frame 35, the latter preferably being equipped with traveling wheels 36, as shown.

As will be readily apparent, the frame 35 extends longitudinally with respect to the barrel 12 and the members 34 may be secured to the frame 35 in any suitable manner, such as for example, by the clamps 38.

The inner end portions of the trunnions 28 are also screw-threaded to receive adjusting nuts 40 which abut inner ends of the sleeves 26 and thereby facilitate taking-up of longitudinal play of the barrel 12 on the trunnions, as will be clearly apparent.

Needless to say, lubricant may be applied to the trunnions 28 in the sleeves 26, and to prevent dispersion of this lubricant, internally screw-threaded caps or cup-shaped covers 42 are provided on externally screw-threaded end portions of the sleeves 26, these covers completely enclosing the inner end portions of the trunnions 28 and the nuts 40, substantially as shown.

Needless to say, the mechanism may be assembled by first installing the trunnions 28 in the sleeves 26, then applying the covers 42 to the sleeves, and thereafter securing the sleeves by means of associated covers 22 to the flanges 20 of the barrel 12.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a bearing structure, the combination of a frame, a stub shaft rigidly secured at one end thereof to said frame and having a screw threaded portion at its other end, a tubular sleeve rotatable on said stub shaft and spaced from said frame, a nut on the screw threaded portion of the stub shaft in abutment with said sleeve to prevent sliding thereof away from said frame, a flange on said sleeve adjacent the frame, a tubular axle enclosing said sleeve and secured at one end thereof to said flange, and a cap threadedly mounted on said sleeve and having an end wall in abutment with the screw threaded end of said stub shaft to prevent sliding of the sleeve toward said frame.

ALFRED A. HALTOM.

REFERENCES CITED

The following references are of record in the file of this patent:

UNITED STATES PATENTS

| Number | Name | Date |
| --- | --- | --- |
| 1,133,956 | Harris | Mar. 30, 1915 |
| 1,219,901 | Alvey | Mar. 20, 1917 |
| 1,288,608 | Johnson | Dec. 24, 1918 |
| 2,144,275 | Scholz | Jan. 17, 1939 |
| 2,248,069 | Domries | July 8, 1941 |
| 2,250,391 | Ober | July 22, 1941 |
| 2,262,654 | Schmeiser | Nov. 11, 1941 |